United States Patent
Kim et al.

(10) Patent No.: US 10,805,822 B2
(45) Date of Patent: Oct. 13, 2020

(54) METHOD AND APPARATUS FOR SUPPORTING MEASUREMENT REPORTING ENHANCEMENT FOR AERIAL DEVICE IN WIRELESS COMMUNICATION SYSTEM

(71) Applicant: LG ELECTRONICS INC., Seoul (KR)

(72) Inventors: Hongsuk Kim, Seoul (KR); Youngdae Lee, Seoul (KR); Yejee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/414,552

(22) Filed: May 16, 2019

(65) Prior Publication Data

US 2019/0357066 A1    Nov. 21, 2019

(30) Foreign Application Priority Data

May 18, 2018   (KR) ......................... 10-2018-0057034

(51) Int. Cl.
*H04W 24/10*   (2009.01)
*H04W 36/00*   (2009.01)

(52) U.S. Cl.
CPC ....... *H04W 24/10* (2013.01); *H04W 36/0083* (2013.01)

(58) Field of Classification Search
CPC ..... H04W 24/10; H04W 48/20; H04W 64/00; H04W 64/003; H04W 64/006; H04W 16/14; H04W 84/12; H04W 36/0022; H04W 36/0083
See application file for complete search history.

(56) References Cited

U.S. PATENT DOCUMENTS

| | | | |
|---|---|---|---|
| 2010/0208707 A1* | 8/2010 | Hamabe | H04W 24/10 370/332 |
| 2013/0044709 A1* | 2/2013 | Adjakple | H04W 76/15 370/329 |
| 2014/0211688 A1* | 7/2014 | Bakker | H04W 48/16 370/315 |
| 2016/0066255 A1* | 3/2016 | Marinier | H04W 56/001 370/350 |
| 2016/0219475 A1* | 7/2016 | Kim | H04W 28/08 |
| 2016/0337964 A1* | 11/2016 | Mochizuki | H04W 52/0206 |
| 2016/0345231 A1* | 11/2016 | Moon | H04W 36/0055 |
| 2018/0192346 A1* | 7/2018 | Nagasaka | H04W 28/08 |
| 2018/0220318 A1* | 8/2018 | Uemura | H04B 17/318 |
| 2019/0306675 A1* | 10/2019 | Xue | H04W 36/30 |

OTHER PUBLICATIONS

3GPP TS 36.331 V15.1.0, 3rd Generation Partnership Project; Technical Specification Group Radio Access Network; Evolved Universal Terrestrial Radio Access (E-UTRA); Radio Resource Control (RRC); Protocol specification (Release 15), Mar. 2018.

* cited by examiner

*Primary Examiner* — Jean A Gelin
(74) *Attorney, Agent, or Firm* — Dentons US LLP

(57) ABSTRACT

A method and apparatus for supporting a measurement reporting enhancement for an aerial device in a wireless communication system is provided. A prohibit timer can be used in order to prohibit frequent measurement reporting, and the prohibit timer may be stopped when a leaving condition for the measurement reporting is satisfied and/or a handover procedure and/or a radio resource control (RRC) connection re-establishment procedure is performed.

4 Claims, 12 Drawing Sheets

METHOD AND APPARATUS FOR SUPPORTING MEASUREMENT REPORTING ENHANCEMENT FOR AERIAL DEVICE IN WIRELESS COMMUNICATION SYSTEM

CROSS-REFERENCE TO RELATED APPLICATIONS

Pursuant to 35 U.S.C. § 119 (e), this application claims the benefit of Korean Patent Application No. 10-2018-0057034 filed on May 18, 2018, the contents of which are all hereby incorporated by reference herein in their entirety.

BACKGROUND OF THE INVENTION

Field of the Invention

The present invention relates to wireless communications, and more particularly, to a method and apparatus for supporting a measurement reporting enhancement for an aerial device in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Much of the past research and development of mobile broadband communication has been primarily devoted to terrestrial communication. Providing tetherless broadband connectivity for unmanned aerial vehicles (UAVs) is an emerging field. UAVs come in various sizes, weights, and fly at different speeds and altitudes. UAV may be called as other names, i.e. drones and/or aerial user equipments (UEs). Specifically, low altitude small UAVs may be focused. The use cases of commercial UAVs are growing rapidly, including delivery, communications and media, inspection of critical infrastructure, surveillance, search-and-rescue operations, agriculture, wildlife conservation, among others.

SUMMARY OF THE INVENTION

Aerial UEs may have different characteristics with terrestrial UEs naturally. For example, the number of detected cells for aerial UEs may increase compared to the number of detected cells for terrestrial UEs. As the number of detected cells for aerial UEs increases, the event for measurement reporting may be triggered more frequently, which may cause signaling overhead. Various options to prevent the frequent measurement reporting have been discussed, and one of the various options is using a prohibit timer. To use the prohibit timer efficiently, a potential problem should be addressed.

In an aspect, a method performed by a wireless device in a wireless communication system is provided. The method includes determining that an entering condition for measurement reporting is satisfied, performing the measurement reporting, starting a prohibit timer for the measurement reporting, and stopping the prohibit timer for the measurement reporting when a leaving condition for the measurement reporting is satisfied.

In another aspect, a method performed by a wireless device in a wireless communication system is provided. The method includes determining that an entering condition for measurement reporting is satisfied, performing the measurement reporting, starting a prohibit timer for the measurement reporting, and stopping the prohibit timer for the measurement reporting when a handover procedure and/or a radio resource control (RRC) connection re-establishment procedure is performed.

In another aspect, a wireless device in a wireless communication system is provided. The wireless device includes a memory, a transceiver, and a processor, operably coupled to the memory and the transceiver. The processor is configured to determine that an entering condition for measurement reporting is satisfied. The transceiver is configured perform the measurement reporting. The processor is configured to start a prohibit timer for the measurement reporting. The processor is configured to stop the prohibit timer for the measurement reporting when a leaving condition for the measurement reporting is satisfied.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
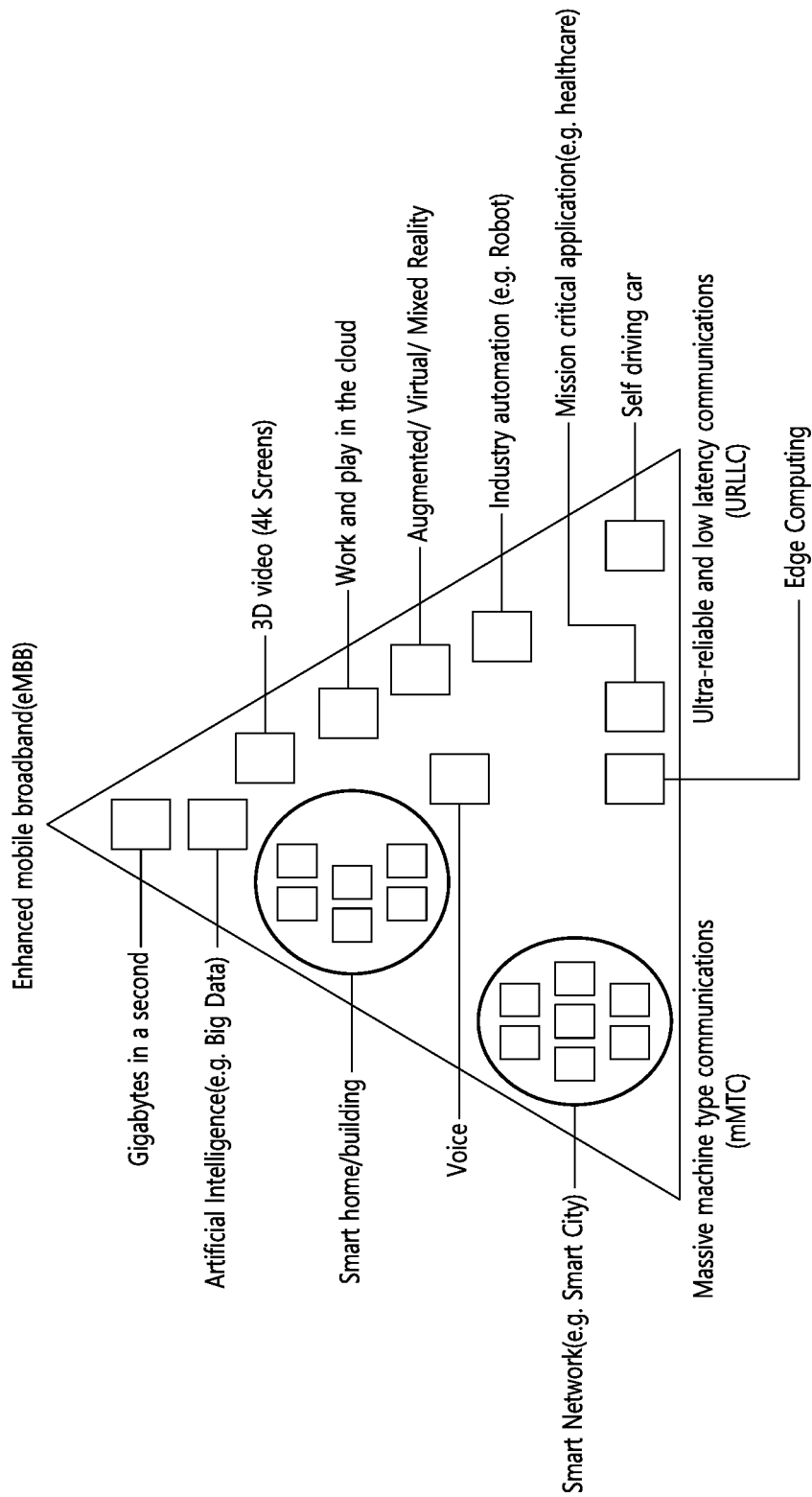
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
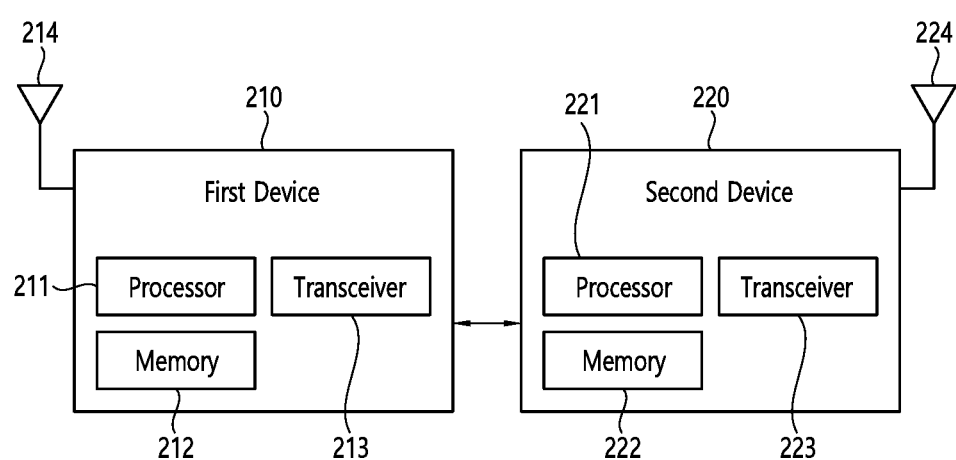
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
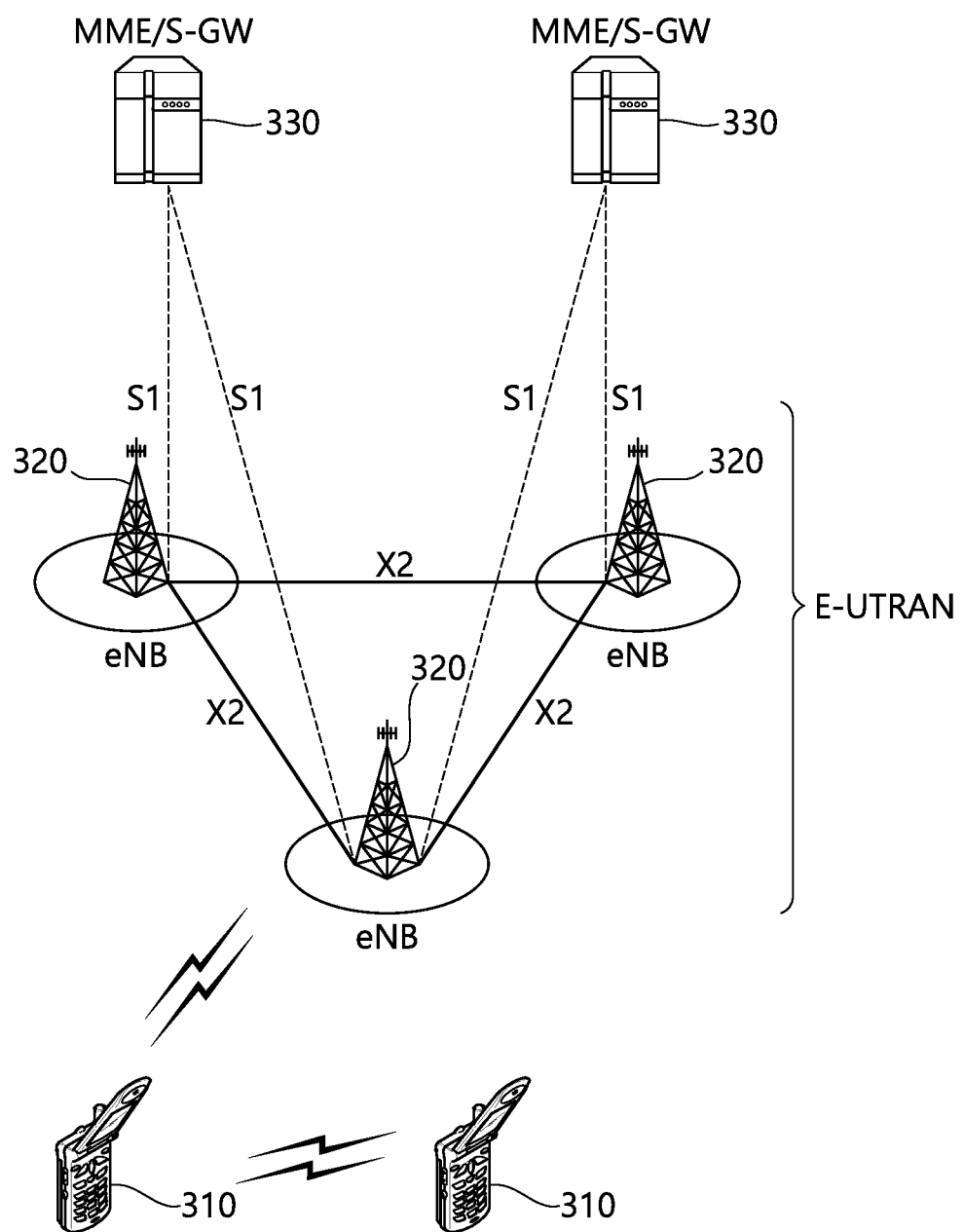
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
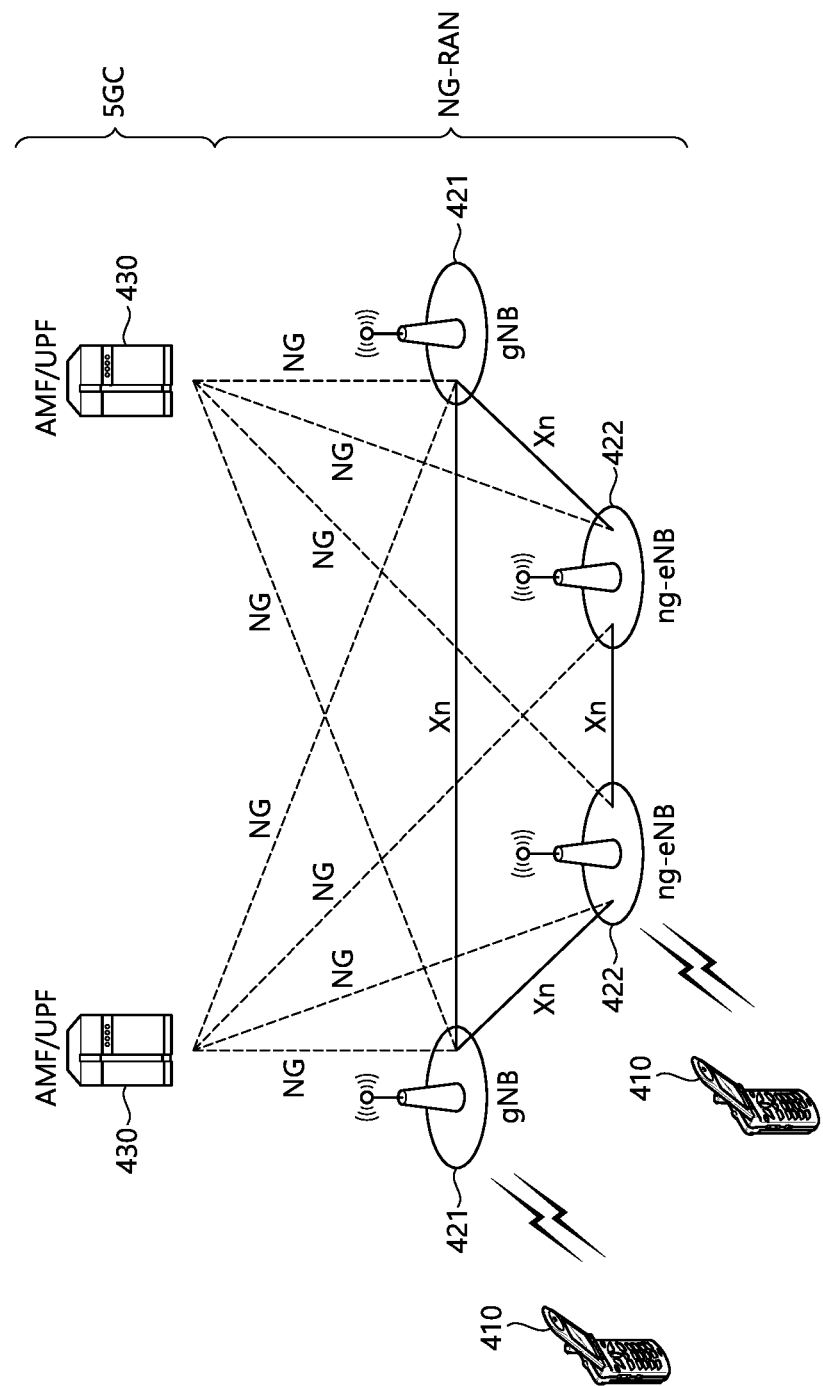
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW.

The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
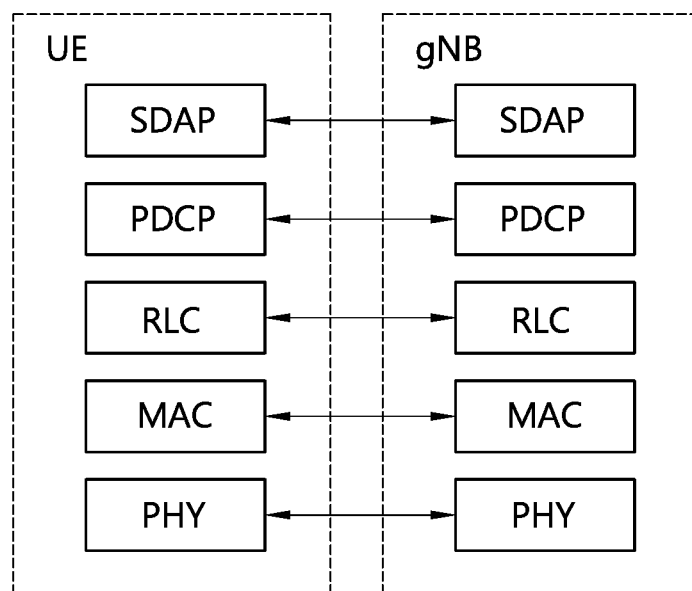
FIG. 5 shows a block diagram of a user plane protocol stack to which the technical features of the present invention can be applied.
Figure 6:
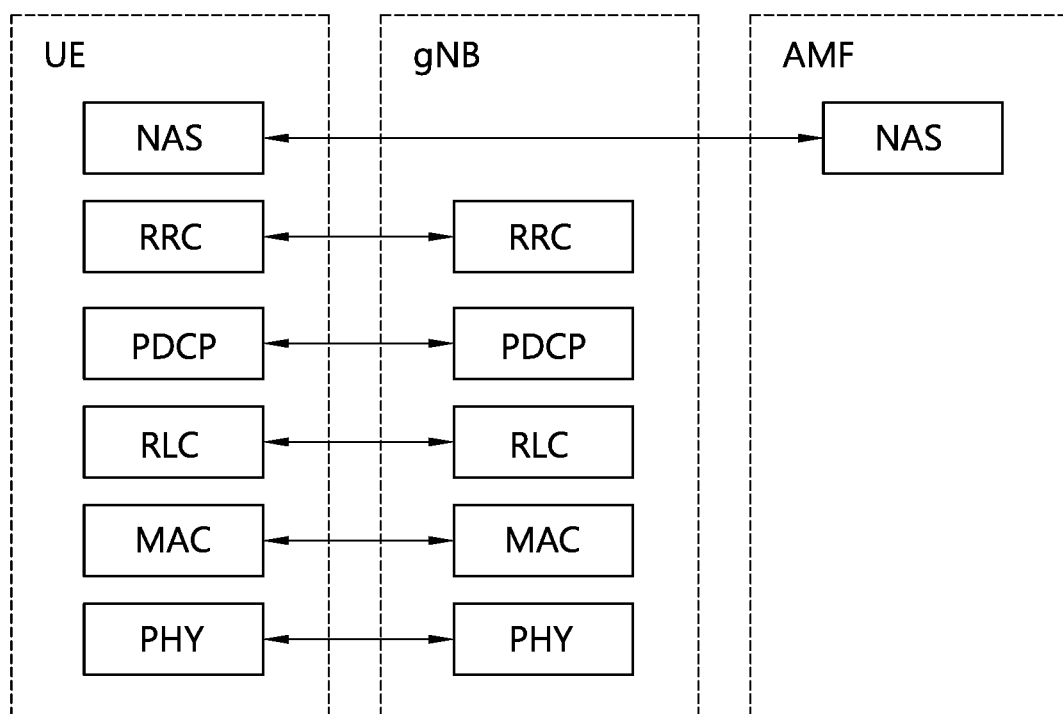
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

UE actions in a handover procedure is described. It may be referred to as Section 5.3.5.4 of 3GPP TS 36.331 V15.1.0 (2018 March).

If the RRCConnectionReconfiguration message includes the mobilityControlInfo (i.e. handover) and the UE is able to comply with the configuration included in this message, the UE shall:

1> stop timer T310, if running;
1> stop timer T312, if running;
1> start timer T304 with the timer value set to t304, as included in the mobilityControlInfo;
1> stop timer T370, if running;
1> if the carrierFreq is included:
2> consider the target primary cell (PCell) to be one on the frequency indicated by the carrierFreq with a physical cell identity indicated by the targetPhysCellId;
1> else:
2> consider the target PCell to be one on the frequency of the source PCell with a physical cell identity indicated by the targetPhysCellId;
1> start synchronising to the DL of the target PCell;

The UE should perform the handover as soon as possible following the reception of the RRC message triggering the handover, which could be before confirming successful reception (HARQ and ARQ) of this message.

1> if bandwidth reduced low complexity (BL) UE or UE in coverage enhancement (CE):
2> if sameSFN-Indication is not present in mobilityControlInfo:
3> acquire the MasterinformationBlock in the target PCell;
1> if makeBeforeBreak is configured:
2> perform the remainder of this procedure including and following resetting MAC after the UE has stopped the uplink transmission/downlink reception with the source cell (s);
1> reset master cell group (MCG) MAC and secondary cell group (SCG) MAC, if configured;
1> re-establish PDCP for all RBs configured with pdcp-config that are established;
1> re-establish MCG RLC and SCG RLC, if configured, for all RBs that are established;
1> configure lower layers to consider the secondary cell(s) (SCell(s)) other than the primary SCell (PSCell), if configured, to be in deactivated state;
1> apply the value of the newUE-Identity as the cell radio network temporary identifier (C-RNTI);
1> if the RRCConnectionReconfiguration message includes the fullConfig:
2> perform the radio configuration procedure;
1> configure lower layers in accordance with the received radioResourceConfigCommon;

1> if the received RRCConnectionReconfiguration message includes the rach-Skip:
2> configure lower layers to apply the rach-Skip for the target MCG;
1> configure lower layers in accordance with any additional fields, not covered in the previous, if included in the received mobilityControlInfo;

UE actions in an RRC connection re-establishment procedure is described. It may be referred to as Section 5.3.7 of 3GPP TS 36.331 V15.1.0 (2018 March).

The UE shall only initiate the procedure either when AS security has been activated or for a narrowband IoT (NB-IoT) UE supporting RRC connection re-establishment for the control plane cellular IoT(CIoT) EPS optimization. The UE initiates the procedure when one of the following conditions is met:
1> upon detecting radio link failure; or
1> upon handover failure; or
1> upon mobility from E-UTRA failure; or
1> upon integrity check failure indication from lower layers concerning SRB1 or SRB2; or
1> upon an RRC connection reconfiguration failure; or
1> upon an RRC connection reconfiguration failure.

Upon initiation of the procedure, the UE shall:
1> stop timer T310, if running;
1> stop timer T312, if running;
1> stop timer T313, if running;
1> stop timer T307, if running;
1> start timer T311;
1> stop timer T370, if running;
1> suspend all RBs, including RBs configured with NR PDCP, except SRB0;
1> reset MAC;
1> release the MCG SCell(s), if configured;
1> apply the default physical channel configuration;
1> except for NB-IoT, for the MCG, apply the default semi-persistent scheduling configuration;
1> for the MCG, apply the default MAC main configuration;
1> release powerPrefIndicationConfig, if configured and stop timer T340, if running;
1> release reportProximityConfig, if configured and clear any associated proximity status reporting timer;
1> release obtainLocationConfig, if configured;
1> release idc-Config, if configured;
1> release measSubframePatternPCell, if configured;
1> release the entire SCG configuration, if configured, except for the DRB configuration (as configured by drb-ToAddModListSCG);
1> if E-UTRAN-NR dual connectivity (EN-DC) is configured:
2> perform EN-DC release;
1> release naics-Info for the PCell, if configured;
1> if connected as a relay node (RN) and configured with an RN subframe configuration:
2> release the RN subframe configuration;
1> release the LTE-WLAN aggregation (LWA) configuration, if configured;
1> release the LTE WLAN radio level integration with IPsec tunnel (LWIP) configuration, if configured;
1> release delayBudgetReportingConfig, if configured and stop timer T342, if running;
1> perform cell selection in accordance with the cell selection process;
1> release bw-PreferenceIndicationTimer, if configured and stop timer T341, if running;
1> release overheatingAssistanceConfig, if configured and stop timer T345, if running;

Measurement related actions upon handover and re-establishment is described. It may be referred to as Section 5.5.6.1 of 3GPP TS 36.331 V15.1.0 (2018 March).

E-UTRAN applies the handover procedure as follows:
when performing the handover procedure, ensure that a measObjectId corresponding to each handover target serving frequency is configured;
when changing the band while the physical frequency remains unchanged, E-UTRAN releases the measObject corresponding to the source frequency and adds a measObject corresponding to the target frequency (i.e. it does not reconfigure the measObject);

E-UTRAN applies the re-establishment procedure as follows:
when performing the connection re-establishment procedure, ensure that a measObjectId corresponding each target serving frequency is configured;
in the first reconfiguration following the re-establishment when changing the band while the physical frequency remains unchanged, E-UTRAN releases the measObject corresponding to the source frequency and adds a measObject corresponding to the target frequency (i.e. it does not reconfigure the measObject);

The UE shall:
1> for each measId included in the measIdList within VarMeasConfig:
2> if the triggerType is set to periodical:
3> remove this measId from the measIdList within VarMeasConfig:
1> if the procedure was triggered due to a handover or successful re-establishment and the procedure involves a change of primary frequency, update the measId values in the measIdList within VarMeasConfig as follows:
2> if a measObjectId value corresponding to the target primary frequency exists in the measObjectList within VarMeasConfig:
3> for each measId value in the measIdList:
4> if the measId value is linked to the measObjectId value corresponding to the source primary frequency:
5> link this measId value to the measObjectId value corresponding to the target primary frequency;
4> else if the measId value is linked to the measObjectId value corresponding to the target primary frequency:
5> link this measId value to the measObjectId value corresponding to the source primary frequency;
2> else:
3> remove all measId values that are linked to the measObjectId value corresponding to the source primary frequency;
1> remove all measurement reporting entries within VarMeasReportList;
1> stop the periodical reporting timer or timer T321, whichever one is running, as well as associated information (e.g. timeToTrigger) for all measId;
1> release the measurement gaps, if activated;

If the UE requires measurement gaps to perform inter-frequency or inter-RAT measurements, the UE resumes the inter-frequency and inter-RAT measurements after the E-UTRAN has setup the measurement gaps.

Aerial UE and aerial communication are described. E-UTRAN based mechanisms providing LTE connection to UEs capable of aerial communication are supported via the following functionalities. The following functionalities may also be supported for NR based mechanisms providing NR connection to UEs capable of aerial communication.

subscription-based aerial UE identification and authorization;

height reporting based on the event that the UE's altitude has crossed a network-configured reference altitude threshold;

interference detection based on a measurement reporting that is triggered when a configured number of cells (i.e. larger than one) fulfils the triggering criteria simultaneously;

signaling of flight path information from UE to E-UTRAN;

Location information reporting, including UE's horizontal and vertical velocity.

The following are general observations on UL/DL interference problem in scenarios involving aerial UEs:

1) In the DL, the percentage of aerial UEs experiencing cell-edge like radio conditions (i.e. poor DL signal to interference and noise ratio (SINR)) is much higher as compared to terrestrial UEs. This is because aerial UEs, due to their high line-of-sight propagation probability, receive DL interference from a larger number of cells than a typical terrestrial UE does. In the DL, there is higher probability that the number of neighbouring cells causing high level of DL interference at the aerial UEs is higher than in the case of terrestrial UEs. For example, reference signal received power (RSRP) statistics show that up to 16 cells causing high level of DL interference can be observed by an aerial UE at heights of 50 m or above.

2) If the eNB antennas are down tilted, an aerial UE whose height is above eNB antenna boresight is likely to be served by side lobes of the antennas. Due to the presence of possible nulls in the sidelobes, an aerial UE may possibly see a stronger signal from a faraway eNB than the one that is geographically closest. Hence, an aerial UE may be served by a faraway base station instead of the closest one. DL pathloss and UL pathloss for an aerial UE may differ in some scenarios where reciprocity does not hold e.g., due to different side lobe orientations in UL and DL, or different channel characteristics in a frequency division duplex (FDD) deployment.

3) Measurement report as defined in the existing LTE specification may not contain measurement results (e.g. RSRP) for all cells significantly interfered by aerial UEs due to limit on the number of reported cells. When the measurement results are ranked at the aerial UE by RSRP without considering eNB transmission power, the aerial UE may report the results corresponding to the cells with the highest RSRP.

4) The RSRP and received signal strength indicator (RSSI) characteristics of aerial UEs in the air are different from those associated with terrestrial UEs.

Due to characteristics of aerial UE and aerial communication, number of detected cells for aerial UE may increase. For example, it is assumed that the scanner can report up to 32 cells per sample and the sampling frequency is between 4 and 9 Hz. At ground level, the number of detectable cells may be around 5, which fits with the fact that a measurement report can report the measurement of up to 8 neighbor cells. For increasing height, the number of detectable cells may increase, so reports containing values of more than 8 cells can be considered. Furthermore, the range of the detected cells may almost double from ground level up to 120 m. As the number of neighbor cells as well as the range of the detected cells increases, the risk of detecting cells with the same physical cell ID (PCI) value (PCI confusion) may increase.

When an aerial UE flies or takes off, events may be triggered consecutively for different cells. For example, threshold for measurement report for cell A, B, C and D may be exceeded one after another, and start of their respective time-to-trigger (TTT) may be followed. Once TTT expires for cell A, the UE sends measurement report. Then, TTT may also expire consecutively for cell B and cell C, respectively. The UE should send measurement report based on expiry of TTT for cell B and cell C. However, the measurement report sent based on expiry of TTT for cell B and cell C may be very similar as the measurement report sent based on expiry of TTT for cell A. Difference of the measurement report may be shown around the measurement report sent based on expiry of TTT for cell D. Thus, it may be beneficial to be able to skip the measurement report based on expiry of TTT for cell B, and possibly also cell C.

So, a prohibit timer to prohibit additional measurement reporting for subsequent cells has been discussed. Specifically, the prohibit timer may prevent sending the measurement report for a configurable time after the event has been triggered and the first measurement report has been sent. The use of the prohibit timer may be associated to the measurement reporting configuration. This method using the prohibit timer can control the amount of measurement reporting, and at the same time, can also enable timely measurement reporting when the event is triggered for the first time.

UE actions regarding the prohibit timer may be as follows.

(1) The UE receives a report configuration with a timer (i.e. prohibit timer) from the network.

(2) If the UE triggers one of configured events when the entering condition is satisfied for a cell, UE starts a timer (i.e. TTT).

(3) If the timer is expired and the cell does not satisfy the leaving condition, the UE reports a measured result to the network.

(4) The UE starts prohibit timer for reported cells and the UE does not trigger event which is same as the previously triggered for the reported cells while the prohibit timer is running.

(5) After the prohibit timer expires, the UE can trigger event which is same as the previously triggered for the reported cells.

Figure 7:
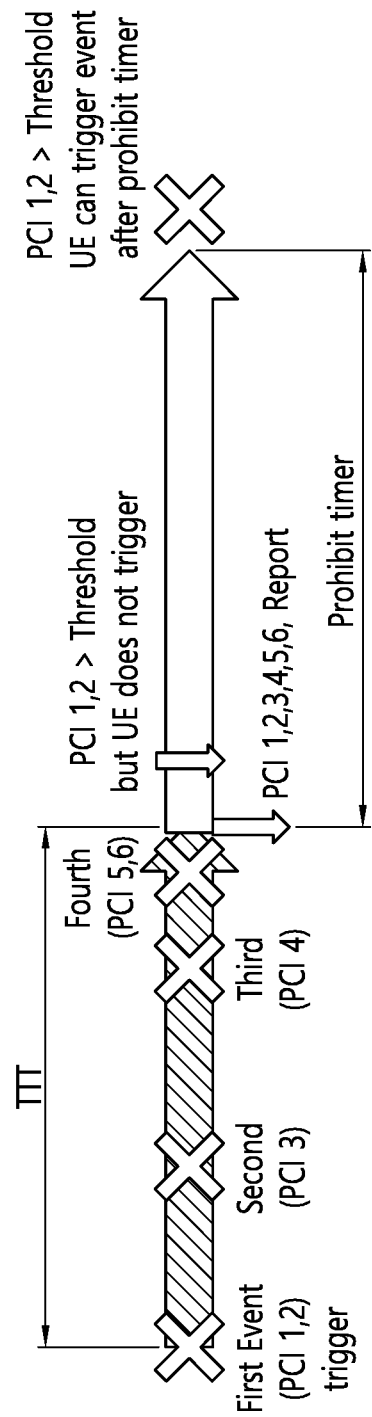
FIG. 7 shows an example of a prohibit timer to which the technical features of the present invention can be applied.

FIG. 7 shows an example of a prohibit timer to which the technical features of the present invention can be applied.

Referring to FIG. 7, the first event for measurement reporting for cells having PCI 1, 2 is triggered. Upon triggering the first event, the UE starts TTT. While the TTT is running, the second event for measurement reporting for cell having PCI 3, the third event for measurement reporting for cell having PCI 4 and the fourth event for measurement reporting for cells having PCI 5, 6 are triggered. But, additional TTT for cells having PCI 3, 4, 5, 6 does not start.

When TTT expires, measurement reporting for cells having 1, 2, 3, 4, 5 and 6 is performed. Upon performing measurement reporting, the UE starts the prohibit timer for all cells reported in the measurement reporting. For example, while the prohibit timer is running, even if the measurement results of cells having PCI 1, 2 is above a threshold, the UE does not trigger event for measurement reporting, because it is the same event for reported cells. Therefore, signaling overhead can be reduced.

When the prohibit timer expires, the UE can trigger event for measurement reporting for reported cells.

However, the prohibit timer described above does not fully consider special cases, especially the case of mobility scenarios and leaving event for the measurement reporting.

Even though the relevant measurement reporting entries are discarded due to mobility and/or satisfaction of the leaving event for the measurement reporting, the prohibit timer described above can be still running, which prevents the measurement reporting of the next measurement results. This may cause unspecified/unexpected handling to perform the next measurement handling.

Therefore, a method for canceling the prohibit timer for measurement reporting may be required.

According to an embodiment of the present invention, the UE behavior may include the followings steps.

1. The UE measures and reports measurement results about some type of cells, such as serving cell, listed cell, or detected cells, via measurementReporting message if at least one cell satisfies one or more configured condition to trigger the periodic/aperiodic event. When reporting the measurement results to the network, the UE starts a prohibit timer to prohibit subsequent measurement reporting(s) if at least one of following conditions is satisfied:

1) If the UE is flying/moving above one or more altitude threshold which is configured by network to identify UE's airborne status: If the UE is not airborne status, i.e. below the altitude threshold, the UE may not use the prohibit timer since frequent measurement reporting can be handled by the legacy LTE features, e.g. update TTT value or hysteresis value.

2) If the UE receives the prohibit timer information, e.g. timer availability, timer value, timer count, prohibited target, to handling the prohibit timer for measurement reporting: The network may configure the prohibit timer information as follows.

Timer availability: This information indicates that the network allows to use the prohibit timer for preventing frequent measurement reporting if configured.

Timer value: This information indicates how long the prohibit timer should be running Timer count: This information indicates how many prohibit timers can be running at once Prohibited target: This information indicates what kind of measurement information can be prohibited. As the prohibited target, the network may configure at least one of measurement identity, carrier frequency, cell index, and/or measurement event.

2. Upon starting the prohibit timer to prohibit subsequent measurement reporting(s), the UE do not send measurement reporting according to the configured prohibited target while the prohibit timer is running. For example, if the prohibited target is set to a measurement event e.g. eventA3, the UE may start the prohibit timer after sending the first measurement report for the measurement event, after that, the UE do not report measurement results for the same measurement event while the prohibit timer is running.

3. The UE stops the prohibit timer to prohibit subsequent measurement reporting(s) while running when at least one of following conditions is satisfied.

If the prohibited target is set to a measurement identity and there is no more measurement reporting entry for the relevant measurement identity in the procedure of measurement reporting leaving condition; and/or If the prohibited target is set to a measurement event and there is no more measurement reporting entry for the relevant measurement event in the procedure of measurement reporting leaving condition; and/or If the prohibited target is set to a carrier frequency and there is no more relevant information i.e. the carrier frequency in the VarMeasReportList for which the triggering conditions have been met in the procedure of measurement reporting leaving condition; and/or If the prohibited target is set to a cell index and there is no more relevant information i.e. the cell index in the VarMeasReportList for which the triggering conditions have been met in the procedure of measurement reporting leaving condition; and/or If the UE performs handover procedure; and/or If the UE performs RRC connection re-establishment procedure.

Figure 8:
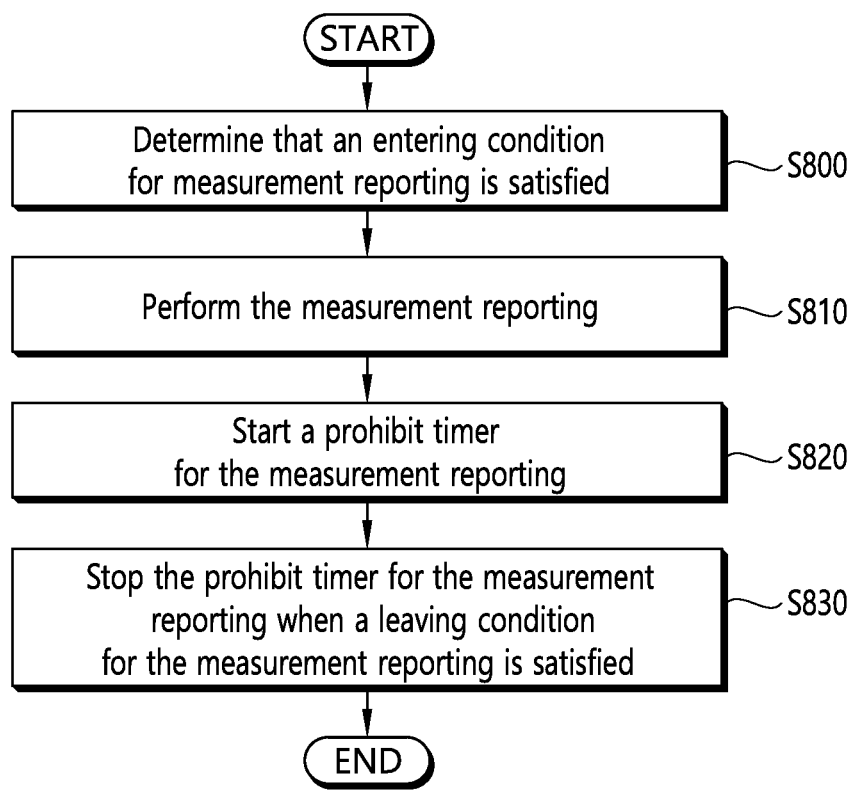
FIG. 8 shows an example of a method for stopping a prohibit timer according to an embodiment of the present invention.

FIG. 8 shows an example of a method for stopping a prohibit timer according to an embodiment of the present invention.

In step S800, the UE determines that an entering condition for measurement reporting is satisfied. Upon determining that the entering condition for measurement reporting is satisfied, the UE may trigger an event for the measurement reporting.

In step S810, the UE performs the measurement reporting. In step S820, the UE starts a prohibit timer for the measurement reporting. The event for the measurement reporting may not be triggered while the prohibit timer is running.

In step S830, the UE stops the prohibit timer for the measurement reporting when a leaving condition for the measurement reporting is satisfied. The leaving condition may include that a prohibited target is set to a measurement identity and there is no more measurement reporting entry for a relevant measurement identity for the leaving condition. The leaving condition may include that a prohibited target is set to a measurement event and there is no more measurement reporting entry for a relevant measurement event for the leaving condition. The UE may trigger the event for the measurement reporting after stopping the prohibit timer.

According to an embodiment of the present invention shown in FIG. 8, by stopping the prohibit timer to prohibit subsequent measurement reporting for the same event, it is able to prevent unspecified/unexpected handling, due to leaving event for the measurement reporting, to perform the next measurement handling.

Figure 9:
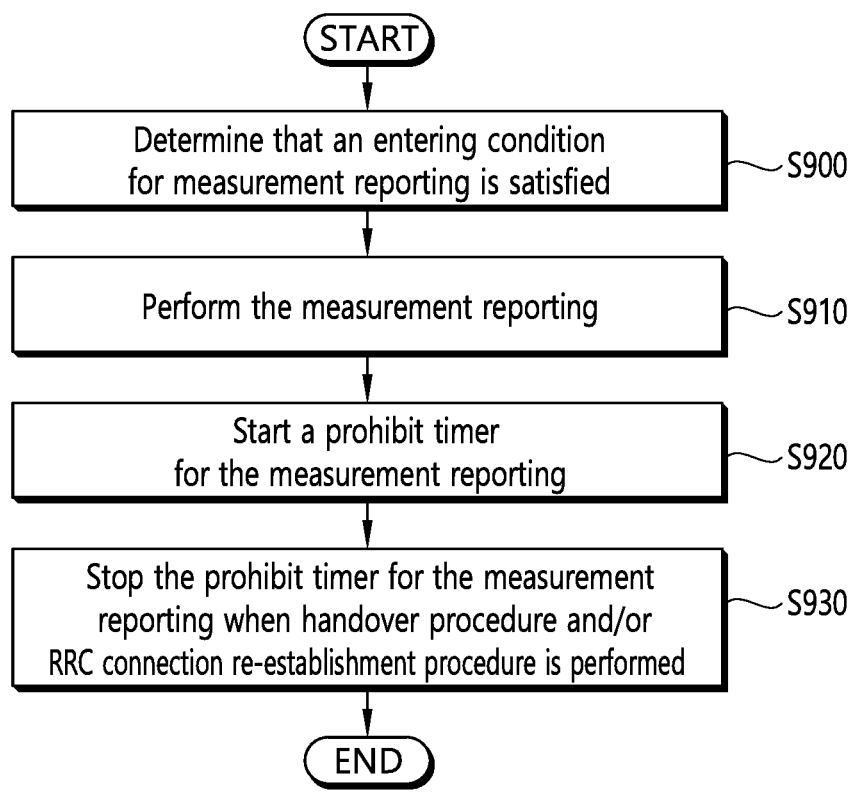
FIG. 9 shows another example of a method for stopping a prohibit timer according to an embodiment of the present invention.

FIG. 9 shows another example of a method for stopping a prohibit timer according to an embodiment of the present invention.

In step S900, the UE determines that an entering condition for measurement reporting is satisfied. Upon determining that the entering condition for measurement reporting is satisfied, the UE may trigger an event for the measurement reporting.

In step S910, the UE performs the measurement reporting. In step S920, the UE starts a prohibit timer for the measurement reporting. The event for the measurement reporting may not be triggered while the prohibit timer is running.

In step S930, the UE stops the prohibit timer for the measurement reporting when a handover procedure and/or an RRC connection re-establishment procedure is performed. The UE may trigger the event for the measurement reporting after stopping the prohibit timer.

According to an embodiment of the present invention shown in FIG. 9, by stopping the prohibit timer to prohibit subsequent measurement reporting for the same event, it is able to prevent unspecified/unexpected handling, due to mobility, to perform the next measurement handling.

According to an embodiment of the present invention, measurement report triggering may be performed is as follows. If security has been activated successfully, the UE shall:

1> for each measId included in the measIdList within VarMeasConfig:
  2> if the corresponding reportConfig includes a purpose set to reportStrongestCellsForSON:
    3> consider any neighboring cell detected on the associated frequency to be applicable;
  2> else if the corresponding reportConfig includes a purpose set to reportCGI:
    3> consider any neighboring cell detected on the associated frequency/set of frequencies (GERAN) which has a physical cell identity matching the value of the cellForWhichToReportCGI included in the corresponding measObject within the VarMeasConfig to be applicable;
  2> else if the corresponding reportConfig includes a purpose set to reportLocation:
    3> consider only the PCell to be applicable;
  2> else:
    3> if the corresponding measObject concerns E-UTRA:
      4> if the ue-RxTxTimeDiffPeriodical is configured in the corresponding reportConfig:
        5> consider only the PCell to be applicable;
      4> else if the reportSSTD-Meas is set to true in the corresponding reportConfig:
        5> consider the PSCell to be applicable;
      4> else if the eventA1 or eventA2 is configured in the corresponding reportConfig:
        5> consider only the serving cell to be applicable;
      4> else if eventC1 or eventC2 is configured in the corresponding reportConfig; or if reportStrongestCSI-RSs is included in the corresponding reportConfig:
        5> consider a channel state information reference signal (CSI-RS) resource on the associated frequency to be applicable when the concerned CSI-RS resource is included in the measCSI-RS-ToAddModList defined within the VarMeasConfig for this measId;
      4> else if measRSSI-ReportConfig is configured in the corresponding reportConfig:
        5> consider the resource indicated by the rmtc-Config on the associated frequency to be applicable;
      4> else if tx-ResourcePoolToAddList is configured in the measObject:
        5> consider the transmission resource pools indicated by the tx-ResourcePoolToAddList defined within the VarMeasConfig for this measId to be applicable;
      4> else:
        5> if useWhiteCellList is set to TRUE:
          6> consider any neighboring cell detected on the associated frequency to be applicable when the concerned cell is included in the white CellsToAddModList defined within the VarMeasConfig for this measId;
        5> else:
          6> consider any neighboring cell detected on the associated frequency to be applicable when the concerned cell is not included in the blackCellsToAddModList defined within the VarMeasConfig for this measId;
        5> for events involving a serving cell on one frequency and neighbors on another frequency, consider the serving cell on the other frequency as a neighboring cell;
      4> if the corresponding reportConfig includes alternativeTimeToTrigger and if the UE supports alternativeTimeToTrigger:
        5> use the value of alternativeTimeToTrigger as the time to trigger instead of the value of timeTo Trigger in the corresponding reportConfig for cells included in the altTTT-CellsToAddModList of the corresponding measObject;
    3> else if the corresponding measObject concerns UTRA or CDMA2000:
      4> consider a neighboring cell on the associated frequency to be applicable when the concerned cell is included in the cellsToAddModList defined within the VarMeasConfig for this measId (i.e. the cell is included in the white-list);

The UE may also consider a neighboring cell on the associated UTRA frequency to be applicable when the concerned cell is included in the csg-allowedReportingCells within the VarMeasConfig for this measId, if configured in the corresponding measObjectUTRA (i.e. the cell is included in the range of physical cell identities for which reporting is allowed).

3> else if the corresponding measObject concerns GERAN:
      4> consider a neighboring cell on the associated set of frequencies to be applicable when the concerned cell matches the ncc-Permitted defined within the VarMeasConfig for this measId;
    3> else if the corresponding measObject concerns WLAN:
      4> consider a WLAN on the associated set of frequencies, as indicated by carrierFreq or on all WLAN frequencies when carrierFreq is not present, to be applicable if the WLAN matches all WLAN identifiers of at least one entry within wlan-Id-List for this measId;
    3> else if the corresponding measObject concerns NR:
      4> if the reportSSTD-Meas is set to pSCell in the corresponding reportConfig:
        5> consider the PSCell to be applicable;
      4> else:
        5> consider any neighboring cell detected on the associated frequency to be applicable when the concerned cell is not included in the blackCellsToAddModList defined within the VarMeasConfig for this measId;
  2> if the triggerType is set to event and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
    3> include a measurement reporting entry within the VarMeasReportList for this measId;
    3> set the numberOfReportsSent defined within the VarMeasReportList for this measId to 0;
    3> include the concerned cell(s) in the cellsTriggeredList defined within the VarMeasReportList for this measId;
    3> if the UE supports T312 and if useT312 is included for this event and if T310 is running:
      4> if T312 is not running:
        5> start timer T312 with the value configured in the corresponding meas Object;
    3> initiate the measurement reporting procedure;
    3> if the T3xx (i.e. prohibit timer) is configured in the corresponding measObject:
      4> start the T3xx with the value configured in the corresponding measObject;
  2> if the triggerType is set to event and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during time- ToTrigger defined for this event within the VarMeasConfig (a subsequent cell triggers the event):

3> if the T3xx is not running:
4> set the numberOfReportsSent defined within the VarMeasReportList for this measId to 0;
4> include the concerned cell(s) in the cellsTriggeredList defined within the VarMeasReportList for this measId;
4> if the UE supports T312 and if useT312 is included for this event and if T310 is running.
5> if T312 is not running:
6> start timer T312 with the value configured in the corresponding meas Object;
4> initiate the measurement reporting procedure;
2> if the trig gerType is set to event and if the leaving condition applicable for this event is fulfilled for one or more of the cells included in the cellsTriggeredList defined within the VarMeasReportList for this measId for all measurements after layer 3 filtering taken during timeTo Trigger defined within the VarMeasConfig for this event:
3> remove the concerned cell(s) in the cellsTriggeredList defined within the VarMeasReportList for this measId;
3> if the UE supports T312 and if useT312 is included for this event and if T310 is running
4> if T312 is not running:
5> start timer T312 with the value configured in the corresponding meas Object;
3> if reportOnLeave is set to TRUE for the corresponding reporting configuration or if a6-ReportOnLeave is set to TRUE for the corresponding reporting configuration:
4> initiate the measurement reporting procedure;
3> if the cellsTriggeredList defined within the VarMeasReportList for this measId is empty:
4> remove the measurement reporting entry within the VarMeasReportList for this measId;
4> stop the periodical reporting timer for this measId, if running;
3> stop timer T3xx if running;
2> if the triggerType is set to event and if the entry condition applicable for this event, i.e. the event corresponding with the eventId of the corresponding reportConfig within VarMeasConfig, is fulfilled for one or more applicable CSI-RS resources for all measurements after layer 3 filtering taken during timeTo Trigger defined for this event within the VarMeasConfig, while the VarMeasReportList does not include an measurement reporting entry for this measId (i.e. a first CSI-RS resource triggers the event):
3> include a measurement reporting entry within the VarMeasReportList for this measId;
3> set the numberOfReportsSent defined within the VarMeasReportList for this measId to 0;
3> include the concerned CSI-RS resource(s) in the csi-RS-TriggeredList defined within the VarMeasReportList for this measId;
3> initiate the measurement reporting procedure;
2> if the triggerType is set to event and if the entry condition applicable for this event, i.e. the event corresponding with the eventId of the corresponding reportConfig within VarMeasConfig, is fulfilled for one or more applicable CSI-RS resources not included in the csi-RS-TriggeredList for all measurements after layer 3 filtering taken during timeTo Trigger defined for this event within the VarMeasConfig (i.e. a subsequent CSI-RS resource triggers the event):

3> set the numberOfReportsSent defined within the VarMeasReportList for this measId to 0;
3> include the concerned CSI-RS resource(s) in the csi-RS-TriggeredList defined within the VarMeasReportList for this measId;
3> initiate the measurement reporting procedure;
2> if the triggerType is set to event and if the leaving condition applicable for this event is fulfilled for one or more of the CSI-RS resources included in the csi-RS-TriggeredList defined within the VarMeasReportList for this measId for all measurements after layer 3 filtering taken during timeToTrigger defined within the VarMeasConfig for this event:
3> remove the concerned CSI-RS resource(s) in the csi-RS-TriggeredList defined within the VarMeasReportList for this measId;
3> if c1-ReportOnLeave is set to TRUE for the corresponding reporting configuration or if c2-ReportOnLeave is set to TRUE for the corresponding reporting configuration:
4> initiate the measurement reporting procedure;
3> if the csi-RS-TriggeredList defined within the VarMeasReportList for this measId is empty:
4> remove the measurement reporting entry within the VarMeasReportList for this measId;
4> stop the periodical reporting timer for this measId, if running;
2> if the triggerType is set to event and if the entry condition applicable for this event, i.e. the event corresponding with the eventId of the corresponding reportConfig within VarMeasConfig, is fulfilled for one or more applicable transmission resource pools for all measurements taken during timeTo Trigger defined for this event within the VarMeasConfig, while the VarMeasReportList does not include an measurement reporting entry for this measId (a first transmission resource pool triggers the event):
3> include a measurement reporting entry within the VarMeasReportList for this measId;
3> set the numberOfReportsSent defined within the VarMeasReportList for this measId to 0;
3> include the concerned transmission resource pool(s) in the poolsTriggeredList defined within the VarMeasReportList for this measId;
3> initiate the measurement reporting procedure;
2> if the triggerType is set to event and if the entry condition applicable for this event, i.e. the event corresponding with the eventId of the corresponding reportConfig within VarMeasConfig, is fulfilled for one or more applicable transmission resource pools not included in the poolsTriggeredList for all measurements taken during timeTo Trigger defined for this event within the VarMeasConfig (a subsequent transmission resource pool triggers the event):
3> set the numberOfReportsSent defined within the VarMeasReportList for this measId to 0;
3> include the concerned transmission resource pool(s) in the poolsTriggeredList defined within the VarMeasReportList for this measId;
3> initiate the measurement reporting procedure;
2> if the triggerType is set to event and if the leaving condition applicable for this event is fulfilled for one or more applicable transmission resource pools included in the poolsTriggeredList defined within the VarMeasReportList for this measId for all measurements taken during timeTo Trigger defined within the VarMeasConfig for this event:
3> remove the concerned transmission resource pool(s) from the poolsTriggeredList defined within the VarMeasReportList for this measId;
3> if the poolsTriggeredList defined within the VarMeasReportList for this measId is empty:

4> remove the measurement reporting entry within the VarMeasReportList for this measId;
4> stop the periodical reporting timer for this measId, if running;
2> if measRSSI-ReportConfig is included and if a (first) measurement result is available:
3> include a measurement reporting entry within the VarMeasReportList for this measId;
3> set the numberOfReportsSent defined within the VarMeasReportList for this measId to 0;
3> initiate the measurement reporting procedure immediately when RSSI sample values are reported by the physical layer after the first L1 measurement duration;
2> else if the purpose is included and set to reportStrongestCells, reportStrongestCellsForSON, reportLocation or sidelink and if a (first) measurement result is available:
3> include a measurement reporting entry within the VarMeasReportList for this measId;
3> set the numberOfReportsSent defined within the VarMeasReportList for this measId to 0;
3> if the purpose is set to reportStrongestCells and reportStrongestCSI-RSs is not included:
4> if the triggerType is set to periodical and the corresponding reportConfig includes the ul-DelayConfig:
5> initiate the measurement reporting procedure immediately after a first measurement result is provided by lower layers;
4> else if the corresponding measurement object concerns WLAN:
5> initiate the measurement reporting procedure immediately after the quantity to be reported becomes available for the PCell and for the applicable WLAN(s);
4> else if the reportAmount exceeds 1:
5> initiate the measurement reporting procedure immediately after the quantity to be reported becomes available for the PCell;
4> else (i.e. the reportAmount is equal to 1):
5> initiate the measurement reporting procedure immediately after the quantity to be reported becomes available for the PCell and for the strongest cell among the applicable cells, or becomes available for the pair of PCell and the PSCell in case of system frame number (SFN) and subframe Liming difference (SSTD) measurements;
3> else if the purpose is set to reportLocation:
4> initiate the measurement reporting procedure immediately after both the quantity to be reported for the PCell and the location information become available;
3> else if the purpose is set to sidelink:
4> initiate the measurement reporting procedure immediately after both the quantity to be reported for the PCell and the channel busy ratio (CBR) measurement result become available;
3> else:
4> initiate the measurement reporting procedure when it has determined the strongest cells on the associated frequency;
2> upon expiry of the periodical reporting timer for this measId:
3> initiate the measurement reporting procedure;
2> if the purpose is included and set to reportCGI and if the UE acquired the information needed to set all fields of cgi-Info for the requested cell:
3> include a measurement reporting entry within the VarMeasReportList for this measId;
3> set the numberOfReportsSent defined within the VarMeasReportList for this measId to 0;
3> stop timer T321;
3> initiate the measurement reporting procedure;
2> upon expiry of the T321 for this measId:
3> include a measurement reporting entry within the VarMeasReportList for this measId;
3> set the numberOfReportsSent defined within the VarMeasReportList for this measId to 0;
3> initiate the measurement reporting procedure;

The UE does not stop the periodical reporting with triggerType set to event or to periodical while the corresponding measurement is not performed due to the PCell RSRP being equal to or better than s-Measure or due to the measurement gap not being setup.

If the UE is configured with discontinuous reception (DRX), the UE may delay the measurement reporting for event triggered and periodical triggered measurements until the Active Time.

According to an embodiment of the present invention, measurement related actions upon handover and re-establishment may be as follows.

E-UTRAN applies the handover procedure as follows:
when performing the handover procedure, ensure that a measObjectId corresponding to each handover target serving frequency is configured;
when changing the band while the physical frequency remains unchanged, E-UTRAN releases the measObject corresponding to the source frequency and adds a measObject corresponding to the target frequency (i.e. it does not reconfigure the measObject);

E-UTRAN applies the re-establishment procedure as follows:
when performing the connection re-establishment procedure, ensure that a measObjectId corresponding each target serving frequency is configured;
in the first reconfiguration following the re-establishment when changing the band while the physical frequency remains unchanged, E-UTRAN releases the measObject corresponding to the source frequency and adds a measObject corresponding to the target frequency (i.e. it does not reconfigure the measObject);

The UE shall:
1> for each measId included in the measIdList within VarMeasConfig:
2> if the triggerType is set to periodical:
3> remove this measId from the measIdList within VarMeasConfig:
1> if the procedure was triggered due to a handover or successful re-establishment and the procedure involves a change of primary frequency, update the measId values in the measIdList within VarMeasConfig as follows:
2> if a measObjectId value corresponding to the target primary frequency exists in the measObjectList within VarMeasConfig:
3> for each measId value in the measIdList:
4> if the measId value is linked to the measObjectId value corresponding to the source primary frequency:
5> link this measId value to the measObjectId value corresponding to the target primary frequency;
4> else if the measId value is linked to the measObjectId value corresponding to the target primary frequency:
5> link this measId value to the measObjectId value corresponding to the source primary frequency;
2> else:
3> remove all measId values that are linked to the measObjectId value corresponding to the source primary frequency;
1> remove all measurement reporting entries within VarMeasReportList;

1> stop the periodical reporting timer or timer T321 or T3xx, whichever one is running, as well as associated information (e.g. timeToTrigger) for all measId;
1> release the measurement gaps, if activated;

If the UE requires measurement gaps to perform inter-frequency or inter-RAT measurements, the UE resumes the inter-frequency and inter-RAT measurements after the E-UTRAN has setup the measurement gaps.

Figure 10:
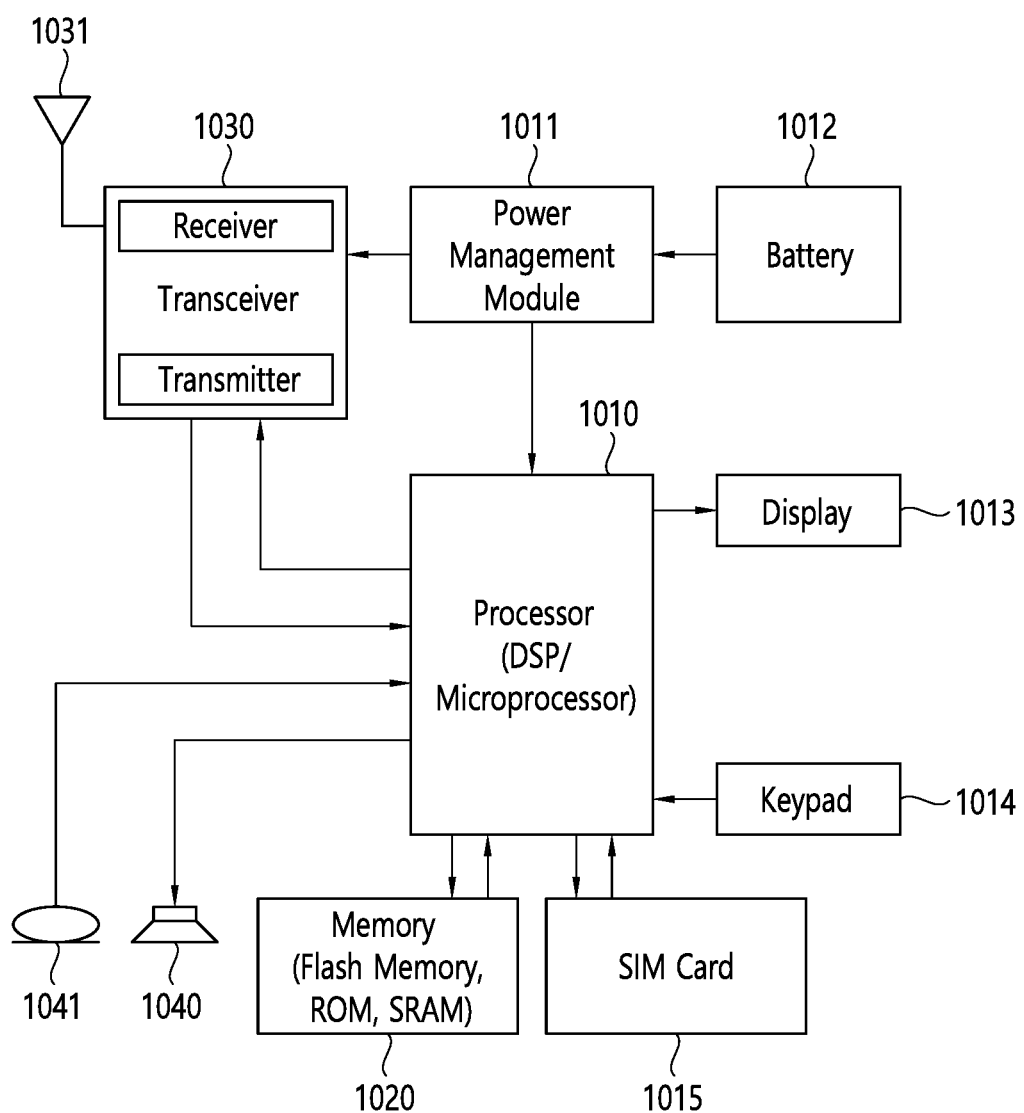
FIG. 10 shows a UE to which the technical features of the present invention can be applied.

FIG. 10 shows a UE to which the technical features of the present invention can be applied.

A UE includes a processor 1010, a power management module 1011, a battery 1012, a display 1013, a keypad 1014, a subscriber identification module (SIM) card 1010, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include application-specific integrated circuit (ASIC), other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1010 may be configured to determine that an entering condition for measurement reporting is satisfied. Upon determining that the entering condition for measurement reporting is satisfied, the processor 1010 may be configured to trigger an event for the measurement reporting.

The processor 1010 may be configured to control the UE and/or the transceiver 1030 to perform the measurement reporting. The processor 1010 may be configured to start a prohibit timer for the measurement reporting. The event for the measurement reporting may not be triggered while the prohibit timer is running.

The processor 1010 may be configured to stop the prohibit timer for the measurement reporting when a leaving condition for the measurement reporting is satisfied. The leaving condition may include that a prohibited target is set to a measurement identity and there is no more measurement reporting entry for a relevant measurement identity for the leaving condition. The leaving condition may include that a prohibited target is set to a measurement event and there is no more measurement reporting entry for a relevant measurement event for the leaving condition.

Alternatively, the processor 1010 may be configured to stop the prohibit timer for the measurement reporting when a handover procedure and/or an RRC connection re-establishment procedure is performed.

The processor 1010 may be configured to trigger the event for the measurement reporting after stopping the prohibit timer.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

According to an embodiment of the present invention shown in FIG. 10, by stopping the prohibit timer to prohibit subsequent measurement reporting for the same event, it is able to prevent unspecified/unexpected handling, due to leaving event for the measurement reporting and/or mobility, to perform the next measurement handling.

The present invention may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 11:
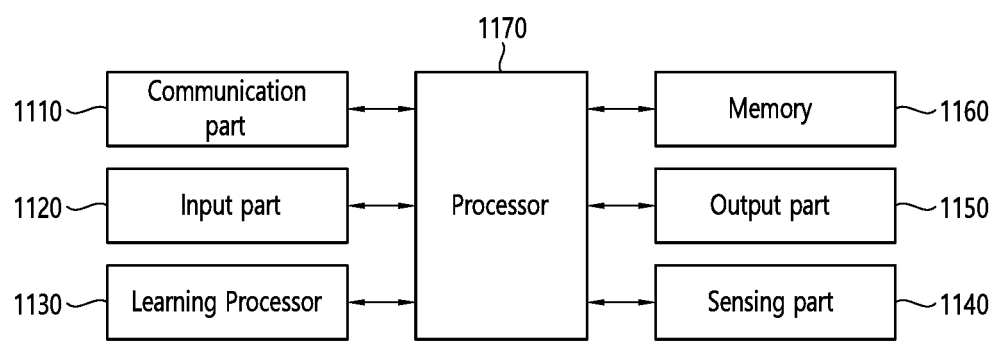
FIG. 11 shows an example of an AI device to which the technical features of the present invention can be applied.

FIG. 11 shows an example of an AI device to which the technical features of the present invention can be applied.

The AI device 1100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 11, the AI device 1100 may include a communication part 1110, an input part 1120, a learning processor 1130, a sensing part 1140, an output part 1150, a memory 1160, and a processor 1170.

The communication part 1110 can transmit and/or receive data to and/or from external devices such as the AI devices and the AI server using wire and/or wireless communication technology. For example, the communication part 1110 can transmit and/or receive sensor information, a user input, a learning model, and a control signal with external devices. The communication technology used by the communication part 1110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1120 can acquire various kinds of data. The input part 1120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1120 can acquire input data to be used when acquiring an output using learning data and a learning model for model learning. The input part 1120 may obtain raw input data, in which case the processor 1170 or the learning processor 1130 may extract input features by preprocessing the input data.

The learning processor 1130 may learn a model composed of an ANN using learning data. The learned ANN can be referred to as a learning model. The learning model can be used to infer result values for new input data rather than learning data, and the inferred values can be used as a basis for determining which actions to perform. The learning processor 1130 may perform AI processing together with the learning processor of the AI server. The learning processor 1130 may include a memory integrated and/or implemented in the AI device 1100. Alternatively, the learning processor 1130 may be implemented using the memory 1160, an external memory directly coupled to the AI device 1100, and/or a memory maintained in an external device.

The sensing part 1140 may acquire at least one of internal information of the AI device 1100, environment information of the AI device 1100, and/or the user information using various sensors. The sensors included in the sensing part 1140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1150 may generate an output related to visual, auditory, tactile, etc. The output part 1150 may include a display unit for outputting visual information, a speaker for outputting auditory information, and/or a haptic module for outputting tactile information.

The memory 1160 may store data that supports various functions of the AI device 1100. For example, the memory

1160 may store input data acquired by the input part 1120, learning data, a learning model, a learning history, etc.

The processor 1170 may determine at least one executable operation of the AI device 1100 based on information determined and/or generated using a data analysis algorithm and/or a machine learning algorithm. The processor 1170 may then control the components of the AI device 1100 to perform the determined operation. The processor 1170 may request, retrieve, receive, and/or utilize data in the learning processor 1130 and/or the memory 1160, and may control the components of the AI device 1100 to execute the predicted operation and/or the operation determined to be desirable among the at least one executable operation. The processor 1170 may generate a control signal for controlling the external device, and may transmit the generated control signal to the external device, when the external device needs to be linked to perform the determined operation. The processor 1170 may obtain the intention information for the user input and determine the user's requirements based on the obtained intention information. The processor 1170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1130 and/or learned by the learning processor of the AI server, and/or learned by their distributed processing. The processor 1170 may collect history information including the operation contents of the AI device 1100 and/or the user's feedback on the operation, etc. The processor 1170 may store the collected history information in the memory 1160 and/or the learning processor 1130, and/or transmit to an external device such as the AI server. The collected history information can be used to update the learning model. The processor 1170 may control at least some of the components of AI device 1100 to drive an application program stored in memory 1160. Furthermore, the processor 1170 may operate two or more of the components included in the AI device 1100 in combination with each other for driving the application program.

Figure 12:
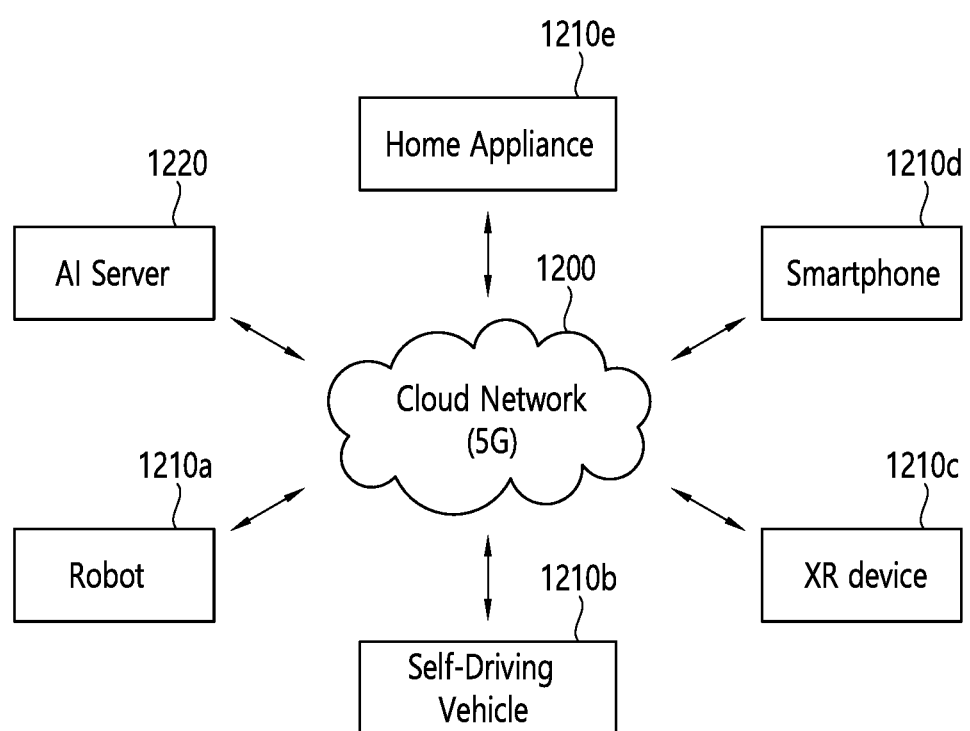
FIG. 12 shows an example of an AI system to which the technical features of the present invention can be applied.

FIG. 12 shows an example of an AI system to which the technical features of the present invention can be applied.

Referring to FIG. 12, in the AI system, at least one of an AI server 1220, a robot 1210*a*, an autonomous vehicle 1210*b*, an XR device 1210*c*, a smartphone 1210*d* and/or a home appliance 1210*e* is connected to a cloud network 1200. The robot 1210*a*, the autonomous vehicle 1210*b*, the XR device 1210*c*, the smartphone 1210*d*, and/or the home appliance 1210*e* to which the AI technology is applied may be referred to as AI devices 1210*a* to 1210*e*.

The cloud network 1200 may refer to a network that forms part of a cloud computing infrastructure and/or resides in a cloud computing infrastructure. The cloud network 1200 may be configured using a 3G network, a 4G or LTE network, and/or a 5G network. That is, each of the devices 1210*a* to 1210*e* and 1220 consisting the AI system may be connected to each other through the cloud network 1200. In particular, each of the devices 1210*a* to 1210*e* and 1220 may communicate with each other through a base station, but may directly communicate with each other without using a base station.

The AI server 1200 may include a server for performing AI processing and a server for performing operations on big data. The AI server 1200 is connected to at least one or more of AI devices constituting the AI system, i.e. the robot 1210*a*, the autonomous vehicle 1210*b*, the XR device 1210*c*, the smartphone 1210*d* and/or the home appliance 1210*e* through the cloud network 1200, and may assist at least some AI processing of the connected AI devices 1210*a* to 1210*e*. The AI server 1200 can learn the ANN according to the machine learning algorithm on behalf of the AI devices 1210*a* to 1210*e*, and can directly store the learning models and/or transmit them to the AI devices 1210*a* to 1210*e*. The AI server 1200 may receive the input data from the AI devices 1210*a* to 1210*e*, infer the result value with respect to the received input data using the learning model, generate a response and/or a control command based on the inferred result value, and transmit the generated data to the AI devices 1210*a* to 1210*e*. Alternatively, the AI devices 1210*a* to 1210*e* may directly infer a result value for the input data using a learning model, and generate a response and/or a control command based on the inferred result value.

Various embodiments of the AI devices 1210*a* to 1210*e* to which the technical features of the present invention can be applied will be described. The AI devices 1210*a* to 1210*e* shown in FIG. 12 can be seen as specific embodiments of the AI device 1100 shown in FIG. 11.

<AI+Robot>

The robot 1210*a* may be implemented as a guide robot, a carrying robot, a cleaning robot, a wearable robot, an entertainment robot, a pet robot, an unmanned flying robot, etc., to which AI technology is applied. The robot 1210*a* may include a robot control module for controlling the operation, and the robot control module may refer to a software module and/or a chip implementing the software module. The robot 1210*a* may acquire the state information of the robot 1210*a* using the sensor information acquired from various kinds of sensors and/or detect (recognize) the surrounding environment and/or the object, and/or generate map data, and/or determine a travel route and/or a travel plan, and/or determine a response to user interaction, and/or determine an operation. The robot 1210*a* can use the sensor information acquired from at least one sensor among the LIDAR, the radar, and/or the camera to determine the travel route and/or the travel plan.

The robot 1210*a* can perform the above-described operations using a learning model composed of at least one ANN. For example, the robot 1210*a* can recognize the surrounding environment and/or the object using the learning model, and can determine the operation using the recognized surrounding information and/or the object information. The learning model may be learned directly from the robot 1210*a* and/or learned from an external device such as the AI server 1200. The robot 1210*a* can directly generate a result using the learning model and perform an operation. The robot 1210*a* may transmit sensor information to an external device such as the AI server 1200 and may receive the generated result and perform an operation.

The robot 1210*a* may determine the travel route and/or the travel plan using at least one of the map data, the object information detected from the sensor information and/or the object information acquired from the external device, and drive the robot 1210*a* according to the determined travel route and/or travel plan by controlling the driving unit. The map data may include object identification information on various objects arranged in a space in which the robot 1210*a* moves. For example, the map data may include object identification information on fixed objects such as walls and doors, and/or on movable objects such as pots and desks. The object identification information may include a name, a type, a distance, and/or a position, etc. The robot 1210a can perform the operation and/or run by controlling the driving unit based on the control/interaction of the user. The robot 1210a may acquire the intention information of the interaction due to the user's operation and/or voice utterance, determine the response based on the acquired intention information, and perform the operation.

<AI+Autonomous-Driving/Self-Driving>

The autonomous vehicle 1210b may be implemented as a mobile robot, a vehicle, an unmanned aerial vehicle, etc., to which AI technology is applied. The autonomous vehicle 1210b may include an autonomous driving control module for controlling the autonomous driving function, and the autonomous driving control module may refer to a software module and/or a chip implementing the software module. The autonomous driving control module may be included in the autonomous vehicle 1210b as a component of the autonomous vehicle 1210b, but may be connected to the outside of the autonomous vehicle 1210b with separate hardware. The autonomous vehicle 1210b may acquire the state information of the autonomous vehicle 1210b using the sensor information acquired from various kinds of sensors and/or detect (recognize) the surrounding environment and/or the object, and/or generate map data, and/or determine a travel route and/or a travel plan, and/or determine an operation. Like the robot 1210a, the autonomous vehicle 1210b can use the sensor information acquired from at least one sensor among the LIDAR, the radar, and/or the camera to determine the travel route and/or the travel plan. In particular, the autonomous vehicle 1210b can recognize an environment and/or an object for an area in which the field of view is obscured and/or over a certain distance by receiving sensor information from external devices, and/or receive the recognized information directly from external devices.

The autonomous vehicle 1210b can perform the above-described operations using a learning model composed of at least one ANN. For example, the autonomous vehicle 1210b can recognize the surrounding environment and/or the object using the learning model, and can determine the travel route using the recognized surrounding information and/or the object information. The learning model may be learned directly from the autonomous vehicle 1210b and/or learned from an external device such as the AI server 1200. The autonomous vehicle 1210b can directly generate a result using the learning model and perform an operation. The autonomous vehicle 1210b may transmit sensor information to an external device such as the AI server 1200 and may receive the generated result and perform an operation.

The autonomous vehicle 1210b may determine the travel route and/or the travel plan using at least one of the map data, the object information detected from the sensor information and/or the object information acquired from the external device, and drive the autonomous vehicle 1210b according to the determined travel route and/or travel plan by controlling the driving unit. The map data may include object identification information on various objects arranged in a space (e.g. road) in which the autonomous vehicle 1210b moves. For example, the map data may include object identification information on fixed objects such as street lamps, rocks, and buildings, and/or on movable objects such as vehicles and pedestrians. The object identification information may include a name, a type, a distance, and/or a position, etc. The autonomous vehicle 1210b can perform the operation and/or run by controlling the driving unit based on the control/interaction of the user. The autonomous vehicle 1210b may acquire the intention information of the interaction due to the user's operation and/or voice utterance, determine the response based on the acquired intention information, and perform the operation.

<AI+XR>

The XR device 1210c may be implemented as a HMD, a HUD, a TV, a mobile phone, a smartphone, a computer, a wearable device, a home appliance, a digital signage, a vehicle, a fixed robot, a mobile robot, etc., to which AI technology is applied.

The XR device 1210c analyzes the three-dimensional point cloud data and/or image data acquired from various sensors and/or from an external device to generate position data and/or attribute data for the three-dimensional points, thereby obtaining information about the surrounding space and/or the real object, and outputting the rendered XR object. For example, the XR device 1210c may output an XR object, which includes the additional information about the recognized object, by corresponding to the recognized object.

The XR device 1210c can perform the above-described operations using a learning model composed of at least one ANN. For example, the XR device 1210c can recognize a real object from three-dimensional point cloud data and/or image data using the learning model, and can provide information corresponding to the recognized real object. The learning model may be learned directly from the XR device 1210c and/or learned from an external device such as the AI server 1200. The XR device 1210c can directly generate a result using the learning model and perform an operation. The XR device 1210c may transmit sensor information to an external device such as the AI server 1200 and may receive the generated result and perform an operation.

<AI+Robot+Autonomous-Driving/Self-Driving>

The robot 1210a may be implemented as a guide robot, a carrying robot, a cleaning robot, a wearable robot, an entertainment robot, a pet robot, an unmanned flying robot, etc., to which AI technology and autonomous-driving technology are applied. The robot 1210a to which the AI technology and the autonomous-driving technology are applied may mean the robot 1210a having the autonomous-driving function itself and/or the robot 1210a interacting with the autonomous vehicle 1210b. The robot 1210a having an autonomous-driving function can collectively refer to devices that move by themselves in accordance with a given travel route and/or move by determining the traveling route by themselves without user's control.

The robot 1210a having the autonomous-driving function and the autonomous vehicle 1210b can use a common sensing method to determine at least one of the travel route and/or the travel plan. For example, the robot 1210a having the autonomous-driving function and the autonomous vehicle 1210b can determine at least one of the travel route and/or the travel plan using the information sensed through the LIDAR, the radar, and/or the camera.

The robot 1210a interacting with the autonomous vehicle 1210b may exist separately from the autonomous vehicle 1210b. The robot 1210a interacting with the autonomous vehicle 1210b may be associated with the autonomous-driving function inside and/or outside the autonomous vehicle 1210, and/or may perform an operation associated with the user aboard the autonomous vehicle 1210b.

The robot 1210a interacting with the autonomous vehicle 1210b may acquire the sensor information on behalf of the autonomous vehicle 1210b and provide it to the autonomous vehicle 1210b. The robot 1210a interacting with the autonomous vehicle 1210b may obtain the sensor information and generate the environment information and/or the object information to provide the autonomous vehicle 1210b, thereby controlling and/or assisting the autonomous-driving function of the autonomous vehicle 1210b.

The robot 1210a interacting with the autonomous vehicle 1210b may monitor the user boarding the autonomous vehicle 1210b and/or may control the functions of the autonomous vehicle 1210b through interaction with the user. For example, when it is determined that the driver is in a drowsy state, the robot 1210a may activate the autonomous-driving function of the autonomous vehicle 1210b and/or assist the control of the driving unit of the autonomous vehicle 1210b. The function of the autonomous vehicle 1210b controlled by the robot 1210a may include not only an autonomous-driving function but also a function provided by a navigation system and/or an audio system provided in the autonomous vehicle 1210b.

The robot 1210a interacting with the autonomous vehicle 1210b may provide information and/or assist the function to the autonomous vehicle 1210b outside the autonomous vehicle 1210b. For example, the robot 1210a, such as a smart traffic light, may provide traffic information including signal information, etc., to the autonomous vehicle 1210b. The robot 1210a, such as an automatic electric charger of an electric vehicle, may interact with the autonomous vehicle 1210b to connect the electric charger to the charging hole automatically.

<AI+Robot+XR>

The robot 1210a may be implemented as a guide robot, a carrying robot, a cleaning robot, a wearable robot, an entertainment robot, a pet robot, an unmanned flying robot, a drone, etc., to which AI technology and XR technology are applied. The robot 1210a to which the XR technology is applied may refer to a robot that is subject to control/interaction in the XR image. In this case, the robot 1210a may be separated from the XR device 1210c and can be associated with each other.

When the robot 1210a that is the subject to control/interaction in the XR image acquires the sensor information from the sensors including the camera, the robot 1210a and/or the XR device 1210c may generate an XR image based on the sensor information and the XR device 1210c can output the generated XR image. The robot 1210a can operate based on a control signal and/or a user's interaction input through the XR device 1210c. For example, the user can acknowledge the XR image corresponding to the viewpoint of the robot 1210a remotely linked through the external device such as the XR device 1210c, and can adjust the autonomous travel path of the robot 1210a, control operation and/or driving, or check the information of neighboring objects, through interaction.

<AI+Autonomous-Driving/Self-Driving+XR>

The autonomous vehicle 1210b may be implemented as a mobile robot, a vehicle, an unmanned aerial vehicle, etc., to which AI technology and XR technology are applied. The autonomous driving vehicle 1210b to which the XR technology is applied may mean an autonomous vehicle having means for providing an XR image and/or an autonomous vehicle that is subject to control/interaction in the XR image. Particularly, the autonomous vehicle 1210b that is subject to control/interaction in the XR image may be separated from the XR device 1210c and can be associated with each other.

The autonomous vehicle 1210b having the means for providing the XR image can acquire the sensor information from the sensors including the camera and output the generated XR image based on the acquired sensor information. For example, the autonomous vehicle 1210b may include an HUD to output an XR image, thereby providing a passenger with a real object and/or an XR object corresponding to an object in the screen. At this time, when the XR object is output to the HUD, at least a part of the XR object may be output so as to overlap with the actual object that the passenger's gaze is directed to. On the other hand, when the XR object is output to the display provided in the autonomous vehicle 1210b, at least a part of the XR object may be output so as to overlap with the object in the screen. For example, the autonomous vehicle 1210b can output XR objects corresponding to objects such as a lane, another vehicle, a traffic light, a traffic sign, a two-wheeled vehicle, a pedestrian, a building, etc.

When the autonomous vehicle 1210b that is the subject to control/interaction in the XR image acquires the sensor information from the sensors including the camera, the autonomous vehicle 1210b and/or the XR device 1210c may generate an XR image based on the sensor information and the XR device 1210c can output the generated XR image. The autonomous vehicle 1210b can operate based on a control signal and/or a user's interaction input through the XR device 1210c.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
   triggering an event for measurement reporting upon an entering condition for the measurement reporting being satisfied for at least one cell;
   performing the measurement reporting for the at least one cell;
   starting a prohibit timer for the at least one cell upon the wireless device moving above an altitude threshold configured by a network, wherein the measurement reporting for the at least one cell is prohibited while the prohibit timer for the at least one cell is running;
   stopping the prohibit timer for the at least one cell upon a leaving condition for the measurement reporting being satisfied for the at least one cell; and
   triggering the event for the measurement reporting and performing the measurement reporting for the at least one cell after stopping the prohibit timer for the at least one cell,
   wherein the leaving condition includes a condition that the at least one cell, for which the measurement reporting is prohibited while the prohibit timer for the at least one cell is running, is set to have a measurement identity and there is no more measurement reporting entry for a relevant measurement identity for the leaving condition.

2. The method of claim 1, wherein the leaving condition includes a prohibited target being set for a measurement event and there is no more measurement reporting entry for a relevant measurement event for the leaving condition.

3. The method of claim 1, wherein the wireless device is in communication with at least one of a user equipment, a network, and/or an autonomous vehicle other than the wireless device.

4. A wireless device in a wireless communication system, the wireless device comprising:
- a memory;
- a transceiver; and
- a processor, operably coupled to the memory and the transceiver, and configured to:
- trigger an event for measurement reporting upon an entering condition for the measurement reporting being satisfied for at least one cell;
- perform the measurement reporting for the at least one cell;
- start a prohibit timer for the at least one cell upon the wireless device moving above an altitude threshold configured by a network, wherein the measurement reporting for the at least one cell is prohibited while the prohibit timer for the at least one cell is running;
- stop the prohibit timer for the at least one cell upon a leaving condition for the measurement reporting being satisfied for the at least one cell;
- trigger the event for the measurement reporting and performing the measurement reporting for the at least one cell after stopping the prohibit timer for the at least one cell;
- wherein the leaving condition includes a condition that the at least one cell, for which the measurement reporting is prohibited while the prohibit timer for the at least one cell is running, is set to have a measurement identity and there is no more measurement reporting entry for a relevant measurement identity for the leaving condition.

* * * * *